US008546296B2

(12) United States Patent
Yabuzaki et al.

(10) Patent No.: US 8,546,296 B2
(45) Date of Patent: Oct. 1, 2013

(54) EXHAUST GAS-PURIFYING CATALYST, POWDERY MATERIAL, AND METHOD OF MANUFACTURING EXHAUST GAS-PURIFYING CATALYST

(75) Inventors: Yuji Yabuzaki, Kakegawa (JP); Akimasa Hirai, Kakegawa (JP); Kenichi Taki, Kakegawa (JP); Tomohito Mizukami, Kakegawa (JP); Satoshi Matsueda, Kakegawa (JP)

(73) Assignee: Cataler Corporation, Shizuoka (JP)

( * ) Notice: Subject to any disclaimer, the term of this patent is extended or adjusted under 35 U.S.C. 154(b) by 0 days.

(21) Appl. No.: 13/327,375

(22) Filed: Dec. 15, 2011

(65) Prior Publication Data

US 2012/0088655 A1 Apr. 12, 2012

Related U.S. Application Data (63) Continuation of application No. PCT/JP2010/060246, filed on Jun. 16, 2010.

(30) Foreign Application Priority Data

Jun. 16, 2009 (JP) ................ 2009-142848

(51) Int. Cl.
| | |
|---|---|
| B01J 23/10 | (2006.01) |
| B01J 23/42 | (2006.01) |
| B01J 23/44 | (2006.01) |
| B01J 23/56 | (2006.01) |
| B01J 8/00 | (2006.01) |
| B01J 8/02 | (2006.01) |
| B32B 3/12 | (2006.01) |
| B01D 53/56 | (2006.01) |
| B01D 53/86 | (2006.01) |
| B01D 53/94 | (2006.01) |
| C01B 21/00 | (2006.01) |
| C01B 23/00 | (2006.01) |
| C01B 25/00 | (2006.01) |
| C01B 31/00 | (2006.01) |
| C01B 33/00 | (2006.01) |
| C01B 35/00 | (2006.01) |
| C01G 28/00 | (2006.01) |
| C01G 30/00 | (2006.01) |

(52) U.S. Cl.
USPC ........... 502/332; 502/333; 502/334; 502/339; 502/304; 502/527.12; 502/527.24; 428/116; 428/117; 428/118; 423/213.5; 423/239.1

(58) Field of Classification Search
USPC ............... 502/332–334, 339, 304, 527.12, 502/527.24; 428/116–118; 423/213.5, 239.1
See application file for complete search history.

(56) References Cited

U.S. PATENT DOCUMENTS

| | | | | | |
|---|---|---|---|---|---|
| 5,057,483 | A | * | 10/1991 | Wan | ............................... 502/304 |
| 5,597,771 | A | * | 1/1997 | Hu et al. | ...................... 502/304 |

(Continued)

FOREIGN PATENT DOCUMENTS

| | | |
|---|---|---|
| EP | 0 669 157 A1 | 8/1995 |
| EP | 0 941 757 A2 | 9/1999 |

(Continued)

OTHER PUBLICATIONS

International Search Report mailed by the International Searching Authority (ISA/JP) on Sep. 7, 2010 in connection with PCT International Application No. PCT/JP2010/060246, filed Jun. 16, 2010.

(Continued)

Primary Examiner — Patricia L Hailey
(74) Attorney, Agent, or Firm — John P. White; Cooper & Dunham LLP (57) ABSTRACT

An exhaust gas-purifying catalyst includes a substrate, and a catalytic layer supported by the substrate. The catalytic layer includes a support made of alumina, an oxygen storage material, an alkaline earth metal and/or a compound of alkaline-earth metal selectively supported by a surface of the support and dispersed on the surface of the support, and a precious metal supported by the surface of the support. A ratio of a number of moles of the alkaline-earth metal in the catalytic layer with respect to a volumetric capacity of the exhaust gas-purifying catalyst falls within a range of 0.0004 mol/L to 0.35 mol/L.

12 Claims, 4 Drawing Sheets

(56) References Cited

U.S. PATENT DOCUMENTS

| | | | |
|---|---|---|---|
| 6,045,764 A * | 4/2000 | Iizuka et al. | 423/213.5 |
| 6,180,075 B1 * | 1/2001 | Lindner et al. | 423/213.2 |
| 6,348,430 B1 | 2/2002 | Lindner et al. | |
| 7,276,212 B2 * | 10/2007 | Hu et al. | 422/177 |
| 7,754,171 B2 * | 7/2010 | Chen et al. | 423/213.2 |
| 8,007,750 B2 * | 8/2011 | Chen et al. | 423/239.1 |
| 2008/0096759 A1 * | 4/2008 | Hori et al. | 502/303 |
| 2009/0175773 A1 * | 7/2009 | Chen et al. | 423/213.5 |
| 2010/0004122 A1 * | 1/2010 | Hori et al. | 502/303 |
| 2012/0055141 A1 * | 3/2012 | Hilgendorff | 60/301 |

FOREIGN PATENT DOCUMENTS

| | | |
|---|---|---|
| EP | 1 787 710 A2 | 5/2007 |
| EP | 1 834 694 A1 | 9/2007 |
| EP | 2 163 303 A1 | 3/2010 |
| EP | 2 368 630 A1 | 9/2011 |
| EP | 2 436 441 A1 | 4/2012 |
| EP | 2 436 442 A1 | 4/2012 |
| JP | 7-232064 A | 9/1995 |
| JP | 10-174866 A | 6/1998 |
| JP | 11-207183 A | 8/1999 |
| JP | 2002-59009 A | 2/2002 |
| JP | 2002-326033 A | 11/2002 |
| JP | 2004-130269 A | 4/2004 |
| JP | 2005-21878 A | 1/2005 |
| JP | 2007-136420 A | 6/2007 |
| JP | 2008-178811 A | 8/2008 |
| JP | 2009-011937 * | 1/2009 |
| JP | 2009-11937 A | 1/2009 |
| WO | WO 98/45026 | 10/1998 |

OTHER PUBLICATIONS

Written Opinion of the International Searching Authority mailed by the International Searching Authority (ISA/JP) on Sep. 7, 2010 in connection with PCT International Application No. PCT/JP2010/060246, filed Jun. 16, 2010.

Notification of Transmittal of Translation of the International Preliminary Report on Patentability, including International Preliminary Report on Patentability and Written Opinion of the International Searching Authority, mailed Jan. 26, 2012 in connection with PCT International Application No. PCT/JP2010/060246, filed Jun. 16, 2010.

Extended European search report, including supplementary search report and European search opinion, issued Jul. 2, 2013 in connection with European patent application No. 10789537.7.

* cited by examiner

EXHAUST GAS-PURIFYING CATALYST, POWDERY MATERIAL, AND METHOD OF MANUFACTURING EXHAUST GAS-PURIFYING CATALYST

CROSS REFERENCE RELATED APPLICATIONS

This application is a Continuation Application of PCT Application No. PCT/JP2010/060246, filed Jun. 16, 2010 and based upon and claiming the benefit of priority from prior Japanese Patent Application No. 2009-142848, filed Jun. 16, 2009, the entire contents of all of which are incorporated herein by reference.

BACKGROUND OF THE INVENTION

1. Field of the Invention

The present invention relates to an exhaust gas-purifying catalyst.

2. Description of the Related Art

Many automotive vehicles such as automobiles are equipped with a three-way catalyst as an exhaust gas-purifying catalyst. The three-way catalyst contains precious metals as catalytic metals. The precious metals promote the oxidation reactions of hydrocarbons (HC) and carbon monoxide (CO) and the reductive reactions of nitrogen oxides ($NO_x$).

However, the precious metals, in particular, palladium and platinum are prone to suffer from poisoning by HC. When such poisoning occurs, the reduction of $NO_x$ becomes hard to occur.

Jpn. Pat. Appln. KOKAI Publication No. 11-207183 describes an exhaust gas-purifying catalyst that contains a refractory inorganic oxide, a cerium-based composite oxide supporting palladium, and a sulfate suppressing the poisoning of palladium by HC. As the refractory inorganic oxide, described are zirconia, alumina, silica, titania and magnesia. As the sulfate, described are sulfates of barium, calcium, strontium, cesium, potassium, magnesium, yttrium and lanthanum. This exhaust gas-purifying catalyst is obtained by immersing a monolith substrate into slurry containing the refractory inorganic oxide, the cerium-based composite oxide supporting palladium, and the sulfate, and then drying the monolith substrate drawn up from the slurry.

BRIEF SUMMARY OF THE INVENTION

The above-described exhaust gas-purifying catalyst delivers an excellent $NO_x$-purifying performance even after a long-term use. The present inventers, however, believed that there was a possibility to achieve a higher performance.

Thus, an object of the present invention is to provide a technique that makes it possible to achieve a higher $NO_x$-purifying performance after a long-term use.

According to a first aspect of the present invention, there is provided an exhaust gas-purifying catalyst comprising a substrate, and a first catalytic layer supported by the substrate, wherein the first catalytic layer includes a first support made of alumina, a first oxygen storage material, an alkaline earth metal and/or a compound of alkaline-earth metal selectively supported by a surface of the first support and dispersed on the surface of the first support, and a precious metal supported by the surface of the first support, and wherein a ratio of a number of moles of the alkaline-earth metal in the first catalytic layer with respect to a volumetric capacity of the exhaust gas-purifying catalyst falls within a range of 0.0004 mol/L to 0.35 mol/L.

According to a second aspect of the present invention, there is provided a powdery material for an exhaust gas-purifying catalyst, comprising a support made of alumina, and an alkaline earth metal and/or a compound of alkaline-earth metal supported by a surface of the support, dispersed on the surface of the support, and having an average particle diameter of 5 nm to 200 nm, wherein the powdery material is oxygen storage material-free.

According to a third aspect of the present invention, there is provided a method of manufacturing an exhaust gas-purifying catalyst, comprising adding an alkaline-earth metal compound and optionally aqueous solution of a sodium salt to a first slurry, the first slurry being oxygen storage material-free and containing a support made of alumina, an organic solvent and a carboxylic acid, drying and firing the first slurry added with the alkaline-earth metal compound to obtain a powdery material containing the support and the alkaline-earth metal compound supported by a surface of the support, preparing a second slurry containing the powdery material ad an oxygen storage material, adding an aqueous solution of a precious metal compound to at least one of the first and second slurry, and drying and firing the second slurry.

DETAILED DESCRIPTION OF THE INVENTION

Embodiments of the present invention will be described below with reference to the drawings. In the drawings, the same reference symbols denote components having the same or similar functions and duplicate descriptions will be omitted.

Figure 1:
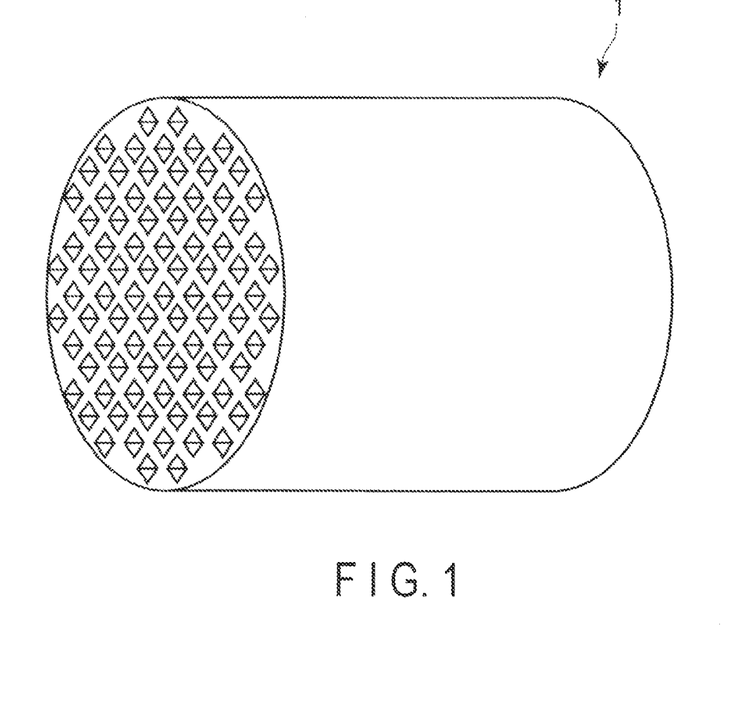
FIG. 1 is a perspective view schematically showing an exhaust gas-purifying catalyst according to an embodiment of the present invention.
Figure 2:
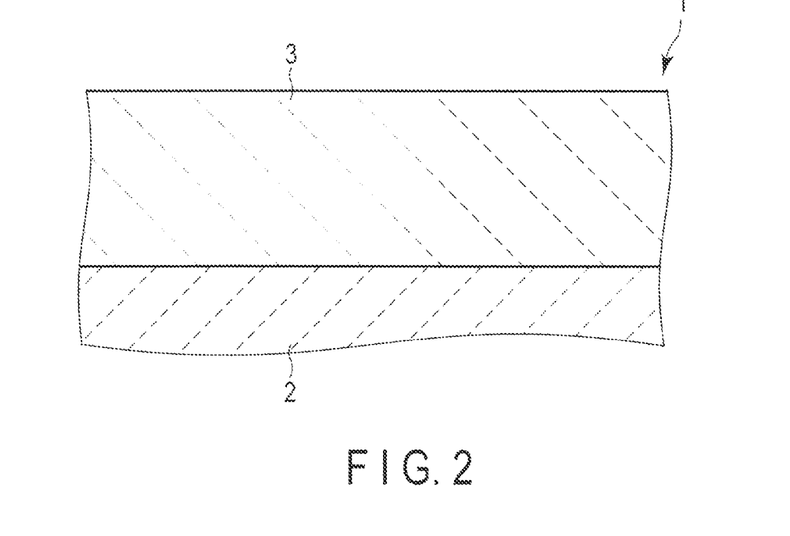
FIG. 2 is an enlarged cross-sectional view schematically showing a part of the exhaust gas-purifying catalyst shown in FIG. 1.
Figure 3:
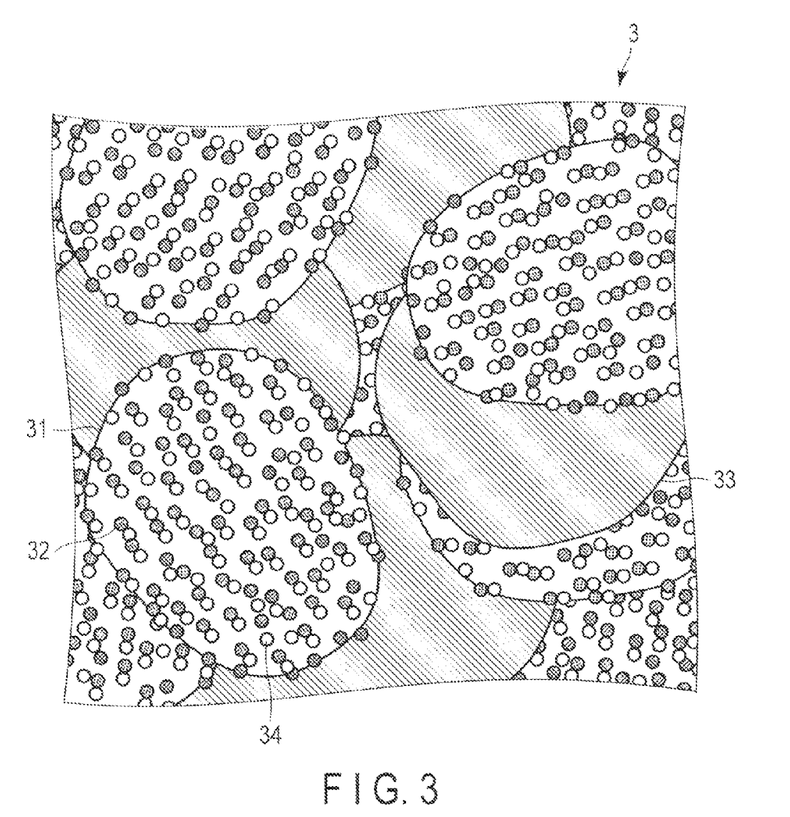
FIG. 3 is an enlarged cross-sectional view schematically showing a part of the exhaust gas-purifying catalyst shown in FIG. 1 at a higher magnification.

FIG. 1 is a perspective view schematically showing an exhaust gas-purifying catalyst according to an embodiment of the present invention. FIG. 2 is an enlarged cross-sectional view schematically showing a part of the exhaust gas-purifying catalyst shown in FIG. 1. FIG. 3 is an enlarged cross-sectional view schematically showing a part of the exhaust gas-purifying catalyst shown in FIG. 1 at a higher magnification.

The exhaust gas-purifying catalyst 1 shown in FIGS. 1 to 3 is a monolith catalyst. The exhaust gas-purifying catalyst 1 includes a substrate 2 such as monolith honeycomb substrate. Typically, the substrate 2 is made of ceramic such as cordierite.

A catalytic layer 3 is formed on the partition walls of the substrate 2. The catalytic layer 3 includes a support 31, an alkaline-earth metal and/or a compound thereof 32, an oxygen storage material 33, ad a precious metal 34.

The support 31 is particles made of alumina. The support 31 plays a role in increasing the specific surface area of the precious metal 34 and dissipating heat generated by catalytic reactions to suppress the sintering of the precious metal 34.

The average particle diameter of the support 31 falls within, for example, a range of 0.5 µm to 50 µm, typically a range of 1 µm to 20 µm. Note that the "average particle diameter" means the value obtained by the following method.

Firstly, a part of the catalytic layer 3 is removed from the exhaust gas-purifying catalyst 1. Next, using a scanning electron microscope (SEM), an SEM image of this sample is taken at a 1,000 to 50,000-fold magnification. Then, the particles in full view are selected from the alumina particles in the SEM image, and the area is obtained for each of the selected particles. Subsequently, diameters of circles having the same areas as the above-described areas are calculated, and an arithmetic mean of the diameters is obtained. The arithmetic mean is stated as the average particle diameter.

The alkaline-earth metal and/or the compound thereof 32 are supported by the surfaces of the support 31. The alkaline-earth metal and/or the compound thereof 32 are dispersed on the surfaces of the support 31. Typically, The alkaline-earth metal and/or the compound thereof 32 are evenly dispersed in a form of particles on the surfaces of the support 31. The alkaline-earth metal and/or the compound thereof suppress the poisoning of the precious metal 34, in particular, palladium and/or platinum by HC.

The alkaline-earth metal is, for example, barium, calcium, strontium, or a combination thereof. The compound of alkaline earth metal 32 is, for example, a salt of alkaline-earth metal. The salt of alkaline-earth metal is, for example, a sulfate such as barium sulfate, a nitrate such as barium nitrate, an acetate such as barium acetate, a carbonate such as barium carbonate, or a combination thereof. The compound of alkaline-earth metal may be an alkaline-earth metal compound other than a salt. The alkaline-earth metal compound other than a salt is, for example, an oxide such as barium oxide. The alkaline-earth metal compound may be a mixture containing a salt(s) such as a combination of barium sulfate and barium acetate and a compound other than a salt such as barium oxide.

The alkaline-earth metal and/or the compound thereof 32 has an average particle diameter smaller than that of the support 31. The average particle diameter of the alkaline-earth metal and/or the compound thereof 32 falls within, for example, a range of 5 nm to 400 nm, typically a range of 10 nm to 200 nm. A ratio of the average particle diameter of the alkaline-earth metal and/or the compound thereof 32 with respect to the average particle diameter of the support 31 falls within, for example, a range of 0.0001 to 0.8, typically a range of 0.0005 to 0.02. Note that the "average particle diameter" means a value obtained by the following method.

Firstly, a part of the catalytic layer 3 is removed from the exhaust gas-purifying catalyst 1. Next, an SEM image of this sample is taken at a 50,000 to 200,000-fold magnification. Then, the particles in full view are selected from the alkaline-earth metal particles and the alkaline-earth metal compound particles in the SEM image, and the area is obtained for each of the selected particles. Subsequently, diameters of circles having the same areas as the above-described areas are calculated, and an arithmetic mean of the diameters is obtained. The arithmetic mean is stated as the average particle diameter.

A ratio of a number of moles of the alkaline-earth metal in the catalytic layer 3 with respect to a volumetric capacity of the exhaust gas-purifying catalyst 1 falls within a range of 0.0004 mol/L to 0.35 mol/L, for example, a range of 0.00042 mol/L to 0.343 mol/L, typically a range of 0.0129 mol/L to 0.857 mol/L. In the case where this ratio is low or high, it is difficult to simultaneously achieving an excellent $NO_x$-purifying performance, an excellent HC-purifying performance, and an excellent CO-purifying performance.

As described above, typically, the alkaline earth metal and/or the compound thereof 32 are evenly dispersed in a form of particles on the surfaces of the support 31. Further, as will be described later, most of the alkaline-earth metal and/or the compound thereof 32 are typically supported by the support 31. In this case, the correlation coefficient $\rho_{Al,AE}$ obtained by the following method is, for example, 0.55 or more, typically 0.79 or more. Further, the correlation coefficient $\rho_{Al,AE}$ is, for example, 0.90 or less, typically 0.85 or less.

Firstly, supposed are 350 planes that are parallel with a main surface of the catalytic layer 3 and divide the catalytic layer 3 into 351 equal parts. Then, supposed are 350 intersection points of the 350 planes and a straight line perpendicular to the main surface of the catalytic layer 20. Hereinafter, each of the 350 intersection points is referred to as an intersection point $P_i$. Note that i is a natural number of 1 to 350.

Next, using an electron probe microanalyzer (EPMA), intensity $I_{Al,i}$ of characteristic X-ray emitted by aluminum and intensity $I_{AE,i}$ of characteristic X-ray emitted by the alkaline-earth metal element are measured for each intersection point $P_i$. Based on the measured values, the correlation coefficient $\rho_{Al,AE}$ given by the following formula (1) is obtained.

$$\rho_{Al,AE} = \frac{C_{Al,AE}}{\sigma_{Al}\sigma_{AE}} \quad (1)$$

In the above formula (1), $C_{Al,AE}$ is a covariance of the intensities $I_{Al,i}$ and $I_{AE,i}$. The covariance $C_{Al,AE}$ is given by the following formula (2). Further, $\sigma_{Al}$ and $\sigma_{AE}$ are standard deviations of the intensities $I_{Al,i}$ and $I_{AE,i}$, respectively. The standard deviations $\sigma_{Al}$ and $\sigma_{AE}$ are given by the following formulae (3) and (4).

$$C_{Al,AE} = \frac{1}{350}\sum_{i=1}^{350}(I_{Al,i} - I_{Al,av})(I_{AE,i} - I_{AE,av}) \quad (2)$$

$$\sigma_{Al} = \sqrt{\frac{1}{350}\sum_{i=1}^{350}(I_{Al,i} - I_{Al,av})^2} \quad (3)$$

$$\sigma_{AE} = \sqrt{\frac{1}{350}\sum_{i=1}^{350}(I_{AE,i} - I_{AE,av})^2} \quad (4)$$

In the above formulae, $I_{Al,av}$ is an arithmetic mean of the $I_{Al,i}$ given by the formula (5) below. $I_{AE,av}$ is an arithmetic mean of the $I_{AE,i}$ given by the following formula (6).

$$I_{Al,av} = \sqrt{\frac{1}{350}\sum_{i=1}^{350}I_{Al,i}} \quad (5)$$

$$I_{AE,av} = \sqrt{\frac{1}{350}\sum_{i=1}^{350} I_{AE,i}} \qquad (6)$$

A part of the alkaline-earth metal and/or the compound thereof 32 may not be supported by the support 31. For example, a part of the alkaline-earth metal and/or the compound thereof 32 may be supported by the surfaces of the oxygen storage material 33. However, when an amount of the alkaline-earth metal and/or the compound thereof 32 that are in contact with the oxygen storage material is increased, the heat resistance of the oxygen storage material 33 will be lowered. Thus, it is desirable that the amount of the alkaline-earth metal and/or the compound thereof 32 that are not supported by the support 31 is small.

The number of first particles of the alkaline-earth metal and/or the compound thereof 32 that are not in contact with the support 31 is set, for example, smaller than the number of second particles of the alkaline-earth metal and/or the compound thereof 32 that are in contact with the support 31. For example, a ratio of the number of the first particles to the number of the second particles is set at 0.80 or less. Typically, almost the whole amount of the alkaline-earth metal and/or the compound thereof 32 is supported by the support 31. It should be noted that this case does not exclude the situation in which a part of the alkaline-earth metal and/or the compound thereof 32 that unavoidably come off from the support 31.

The numbers of the first and second particles are determined by the following method.

Firstly, a part of the catalytic layer 3 is removed from the exhaust gas-purifying catalyst 1. Next, an SEM image of this sample is taken at a 1,000 to 200,000-fold magnification. Then, counted is the number of alkaline-earth metal particles and alkaline-earth metal compound particles that are not in contact with the support 31. This number is stated as the number of the first particles. Similarly, counted is the number of alkaline-earth metal particles and alkaline-earth metal compound particles that are in contact with the support 31. This number is stated as the number of the second particles.

The alkaline-earth metal and/or the compound of alkaline-earth metal 32 are selectively supported by surfaces of the support 31. Note that "selectively supported" means almost the whole amount of the alkaline-earth metal and/or the compound of alkaline-earth metal 32 are supported by the support 31. Note also that this case does not exclude the situation in which a part of the alkaline-earth metal and/or the compound thereof 32 that unavoidably come off from the support 31. In the case where the surfaces of the support 31 selectively support, a higher performance in purifying exhaust gas can be achieved as compared with the case where the oxygen storage material 33 selectively supports the alkaline-earth metal and/or the compound of alkaline-earth metal 32 and the case where the support 31 and the oxygen storage material 33 evenly support the alkaline-earth metal and/or the compound of alkaline-earth metal 32.

The oxygen storage material 33 is in a form of particles and almost uniformly mixed with the support 31 in the catalytic layer 3. The oxygen storage material 33 stores oxygen under an oxygen-rich condition and emits oxygen under an oxygen-lean condition so as to optimize the oxidation reactions of HC and CO and the reductive reactions of $NO_x$.

The oxygen storage material 33 is, for example, ceria, a composite oxide of ceria with another metal oxide, or a mixture thereof. As the composite oxide, for example, a composite oxide of ceria and zirconia can be used.

The oxygen storage material 33 may not support the precious metal 34 or may support a part of the precious metal 34. In general, when loading a trace amount of precious metal to the oxygen storage material, the oxygen storage capacity increases.

As described above, typically, most of the alkaline-earth metal and/or the compound thereof are supported by the support 31. In this case, the correlation coefficient $\rho_{Al,AE}$ obtained by the following manner is, for example, 0.70 or less, typically 0.50 or less.

Firstly, supposed are 350 planes that are parallel with the main surface of the catalytic layer 3 and divide the catalytic layer 3 into 351 equal parts. Then, supposed are 350 intersection points of the 350 planes and a straight line perpendicular to the main surface of the catalytic layer 20. Hereinafter, each of the 350 intersection points is referred to as an intersection point $P_j$. Note that j is a natural number of 1 to 350.

Next, using an EPMA, intensity $I_{Ce,j}$ of characteristic X-ray emitted by cerium and intensity $I_{AE,j}$ of characteristic X-ray emitted by the alkaline-earth metal element are measured for each intersection point $P_j$. Based on the measured values, the correlation coefficient $\rho_{Ce,AE}$ given by the following formula (7) is obtained.

$$\rho_{Ce,AE} = \frac{C_{Ce,AE}}{\sigma_{Ce}\sigma_{AE}} \qquad (7)$$

In the above formula (7), $C_{Ce,AE}$ is a covariance of the intensities $I_{Ce,j}$ and $I_{AE,j}$. The covariance $C_{Ce,AE}$ is given by the following formula (8). Further, $\sigma_{Ce}$ and $\sigma_{AE}$ are standard deviations of the intensities $I_{Ce,j}$ and $I_{AE,j}$, respectively. The standard deviations $\sigma_{Ce}$ and $\sigma_{AE}$ are given by the following formulae (9) and (10).

$$C_{Ce,AE} = \frac{1}{350}\sum_{j=1}^{350} (I_{Ce,j} - I_{Ce,av})(I_{AE,j} - I_{AE,av}) \qquad (8)$$

$$\sigma_{Ce} = \sqrt{\frac{1}{350}\sum_{j=1}^{350} (I_{Ce,j} - I_{Ce,av})^2} \qquad (9)$$

$$\sigma_{AE} = \sqrt{\frac{1}{350}\sum_{j=1}^{350} (I_{AE,j} - I_{AE,av})^2} \qquad (10)$$

In the above formulae, $I_{Ce,av}$ is an arithmetic mean of the $I_{Ce,j}$ given by the formula (11) below. $I_{AE,av}$ is an arithmetic mean of the $I_{AE,j}$ given by the following formula (12).

$$I_{Ce,av} = \sqrt{\frac{1}{350}\sum_{j=1}^{350} I_{Ce,j}} \qquad (11)$$

$$I_{AE,av} = \sqrt{\frac{1}{350}\sum_{j=1}^{350} I_{AE,j}} \qquad (12)$$

The precious metal 34 is in a form of particles and supported by the support 31 or by the support 31 and the oxygen storage material 33. The precious metal 34 promotes the oxidation reactions of HC ad CO and the reductive reactions of $NO_x$. In addition, the precious metal 34 supported by the oxygen storage material 33 increases the oxygen storage capacity of the oxygen storage material 33 as described above.

The precious metal 34 is, for example, one or more of platinum group elements. The platinum group element is, for example, palladium, platinum or rhodium. Typically, the precious metal 34 is palladium and/or platinum.

The precious metal 34 has an average particle diameter smaller than that of the support 31. The average particle diameter of the precious metal 34 falls within, for example, a range of 0.5 nm to 20 nm, typically a range of 1 nm to 10 nm. Note that the "average particle diameter" means the value obtained by the same method as that described for the average particle diameter of the alkaline-earth metal and/or the compound thereof 32.

A ratio of a mass of the precious metal 34 to an equivalent mass of the alkaline-earth metal and/or its compound 32, which is a mass of a sulfate thereof, is set within, for example, a range of 1/80 to 10. Note that the oxygen storage capacity increases when the oxygen storage material is loaded with a trace amount of precious metal as described above. Note also that the support 31 is excellent in heat resistance as compared with the oxygen storage material 33 and has a superior ability in suppressing sintering of the precious metal. Thus, for example, 0.01% by mass or more of the precious metal 34 may be supported by the support 31. Typically, the density of the precious metal 34 on the support 31 is equal to or higher than the density of the precious metal 34 on the oxygen storage material 33.

The correlation coefficient $\rho_{PM,AE}$ obtained for the precious metal and the alkaline-earth metal by the following method is, for example, 0.49 or more, typically 0.70 or more. Further, the correlation coefficient $\rho_{PM,AE}$ is, for example, 0.81 or less, typically 0.76 or less.

Firstly, supposed are 350 planes that are parallel with the main surface of the catalytic layer 3 and divide the catalytic layer 3 into 351 equal parts. Then, supposed are 350 intersection points of the 350 planes and a straight line perpendicular to the main surface of the catalytic layer 20. Hereinafter, each of the 350 intersection points is referred to as an intersection point $P_k$. Note that k is a natural number of 1 to 350.

Next, an EPMA, intensity $I_{PM,k}$ of characteristic X-ray emitted by the precious metal and intensity $I_{AE,k}$ of characteristic X-ray emitted by the alkaline-earth metal element are measured for each intersection point $P_k$. Based on the measured values, the correlation coefficient $\rho_{PM,AE}$ given by the following formula (13) is obtained.

$$\rho_{PM,AE} = \frac{C_{PM,AE}}{\sigma_{PM} \sigma_{AE}} \quad (13)$$

In above formula (13), $C_{PM,AE}$ is a covariance of the intensities $I_{PM,k}$ and $I_{AE,k}$. The covariance $C_{PM,AE}$ is given by the following formula (14). Further, $\sigma_{PM}$ and $\sigma_{AE}$ are standard deviations of the intensities $I_{PM,k}$ and $I_{AE,k}$, respectively. The standard deviations $\sigma_{PM}$ and $\sigma_{AE}$ are given by the following formulae (15) and (16).

$$C_{PM,AE} = \frac{1}{350} \sum_{k=1}^{350} (I_{PM,k} - I_{PM,av})(I_{AE,k} - I_{AE,av}) \quad (14)$$

$$\sigma_{PM} = \sqrt{\frac{1}{350} \sum_{k=1}^{350} (I_{PM,k} - I_{PM,av})^2} \quad (15)$$

$$\sigma_{AE} = \sqrt{\frac{1}{350} \sum_{k=1}^{350} (I_{AE,k} - I_{AE,av})^2} \quad (16)$$

In the above formulae, $I_{PM,av}$ is an arithmetic mean of the $I_{PM,k}$ given by the formula (17) below. $I_{AE,av}$ is an arithmetic mean of the $I_{AE,k}$ given by the following formula (18).

$$I_{PM,av} = \sqrt{\frac{1}{350} \sum_{k=1}^{350} I_{PM,k}} \quad (17)$$

$$I_{AE,av} = \sqrt{\frac{1}{350} \sum_{k=1}^{350} I_{AE,k}} \quad (18)$$

The catalytic layer 3 may contain other components in addition to the above-described components. For example, the catalytic layer 3 may further contain a rare-earth element such as neodymium, lanthanum, praseodymium and yttrium or a compound thereof. The additional component may be present in a form of particles independent of the support 31, the alkaline-earth metal and/or the compound thereof 32, the oxygen storage material 33 and the precious metal 34. Alternatively, the additional component may be included in the compounds exemplified for the oxygen storage material 33.

In the exhaust gas-purifying catalyst 1, most of the precious metal 34 is in contact with the alkaline-earth metal and/or the compound thereof 32 or positioned in the vicinity of the alkaline-earth metal and/or the compound thereof 32. Thus, the exhaust gas-purifying catalyst 1 is less prone to be cause poisoning of the precious metal 34 by HC.

Therefore, the exhaust gas-purifying catalyst 1 delivers an excellent $NO_x$-purifying performance even after a long-term use.

The exhaust gas-purifying catalyst 1 is manufactured by, for example, the following method.

Firstly, prepared is slurry containing alumina powder, an organic solvent such as toluene, and a carboxylic acid such as a combination of lauric acid and trifluoroacetic acid. As the organic solvent, for example, a nonpolar solvent such as toluene is used. As the carboxylic acid, for example, a combination of fluorocarboxylic acid having an alkyl group whose hydrogen atoms are substituted with fluorine atoms and a carboxylic acid having an alkyl group whose hydrogen atoms are not substituted. As the fluorocarboxylic acid, for example, trifluoroacetic acid is used. As the carboxylic acid having an alkyl group whose hydrogen atoms are not substituted, for example, lauric acid is used.

Next, an alkaline-earth metal compound, for example an oxide of an alkaline-earth metal such as barium oxide is added to the slurry, and an aqueous solution of sodium salt such as sodium sulfate is further added to the slurry, if necessary. The slurry is stirred, for example, at 65° C. for 24 hours.

Then, the slurry is filtrated. The filter cake thus obtained is dried and then fired, for example, at 240° C. for 12 hours. As above, first composite particles made of alumina particles 31 and an alkaline-earth metal compound 32 supported on surfaces thereof are obtained in a form of a powdery material.

Thereafter, slurry containing the first composite particles, an oxygen storage material 33, and an aqueous solution of a precious metal compound is prepared. A substrate 2 such as monolith honeycomb substrate is coated with the slurry. The coated film is dried and then fired to obtain an exhaust gas-purifying catalyst 1.

According to this method, the precious metal 34 is supported not only by the first composite particles but also by the oxygen storage material 33. In the case where the precious metal 34 is supported only by the first composite particles, for example, the following method is employed.

Firstly, slurry containing the above-described first composite particles and an aqueous solution of a precious metal compound is prepared. Then, the precious metal in the slurry is allowed to precipitate onto to first composite particles. Thereafter, the slurry is filtrated. The filter cake thus obtained is dried and then fired. As above, second composite particles made of alumina particles 31 and an alkaline-earth metal compound 32 and the precious metal 34 supported by the surfaces thereon is prepared in a form of a powdery material.

Next, slurry containing the second composite particles, an oxygen storage material 33 and water is prepared. A substrate 2 such as monolith honeycomb substrate is coated with the slurry. The coated film thus obtained is dried and then fired. Thus, an exhaust gas-purifying catalyst 1 is obtained.

Without willing to be bound by a theory, the present inventors consider the reason why these methods allow fine particles of the alkaline-earth metal compound 32 to be uniformly supported by the surfaces of the alumina particles 31 as follows. This will be describe below on the case where a combination of lauric acid and trifluoroacetic acid is used as the carboxylic acid and toluene is used as the organic solvent.

An alkaline-earth metal compound can be supported by the surfaces of alumina particles, for example, by adding an aqueous solution of alkaline-earth metal acetate to slurry obtained by dispersing alumina particles in water and then adding sulfuric acid thereto. However, according to this method, alkaline-earth metal sulfate as a reaction product causes aggregation. Thus, fine particles of the alkaline-earth metal compound cannot be uniformly supported by the surfaces on the alumina particles. Negatively charged carboxyl groups of lauric acid molecules form electrostatic bonds with an alkaline-earth metal compound particle having a positively charged surface. On the other hand, negatively charged carboxyl groups of other lauric acid molecules form electrostatic bonds with an alumina particle having a positively charged surface. The alkaline-earth metal compound particle and the alumina particle to which lauric acid molecules are bound exhibit a higher dispersibility in toluene as compared with the alkaline-earth metal compound particle and the alumina particle to which lauric acid molecules are not bound. Further, the carboxyl groups of the lauric acid can interact with trifluoroacetic acid. That is, lauric acid and trifluoroacetic acid promote movements of the alkaline-earth metal compound particle and the alumina particle to move closer to each other. Thus, according to the above-described method, fine particles of the alkaline-earth metal compound 32 can be uniformly supported on the surfaces of the alumina particles 31.

Note that an unsubstituted carboxylic acid having a low molecular weight has a small effect in increasing the dispersibility of the particles because its alkyl group has a low hydrophobicity. Therefore, as the unsubstituted carboxylic acid, for example, an unsubstituted carboxylic acid whose alkyl group has 9 to 13 carbon atoms is used.

In these methods, for example, a powdery material in which alkaline-earth metal compound has an average particle diameter of 5 to 200 nm is manufactured as an intermediate product. Note that the "average particle diameter" is determined by the same method as that described for the alkaline-earth metal and/or the compound thereof 32.

In these method, manufactured as the intermediate product is, for example, a powdery material that offers a correlation coefficient $\rho 0_{Al,AE}$ of 0.80 or more, typically a powdery material that offers a correlation coefficient $\rho 0_{Al,AE}$ falling within a range of 0.80 to 0.90. The correlation coefficient $\sigma 0_{Al,AE}$ can be obtained by the following method.

Firstly, an SEM image of the powdery material is taken at a 1,000 to 50,000-fold magnification. Then, the particles in full view are selected from the particles in the SEM image, for example, alumina particles and oxygen storage material particles in the SEM image.

Next, three regions each having a size of 3 μm×3 μm are selected on one of the selected particles, and an area analysis using energy-dispersive X-ray spectrometry is performed on each region. This obtains intensity $I0_{Al,m}$ of characteristic X-ray emitted by aluminum and intensity $I0_{AE,m}$ of characteristic X-ray emitted by the alkaline-earth metal element. An arithmetic mean of the characteristic X-ray intensities $I0_{Al,m}$ obtained for the three regions is stated as a characteristic X-ray intensity $I0_{Al,n}$ of aluminum of this particle. Similarly, an arithmetic mean of the characteristic X-ray intensities $I0_{AE,m}$ obtained for the three regions is stated as a characteristic X-ray intensity $I0_{AE,n}$ of alkaline-earth metal element of this particle.

The above operation is repeated on 100 particles selected randomly. Then, based on the characteristic X-ray intensities $I0_{Al,n}$ and $I0_{AE,n}$, the correlation coefficient $\rho 0_{Al,AE}$ given by the following formula (19) is obtained.

$$\rho 0_{Al,AE} = \frac{C0_{Al,AE}}{\sigma 0_{Al} \sigma 0_{AE}} \quad (19)$$

In the above formula (19), $C0_{Al,AE}$ is a covariance of the intensities $I0_{Al,n}$ and $I0_{AE,n}$. The covariance $C0_{Al,AE}$ is given by the following formula (20). Further, $\sigma 0_{Al}$ and $\sigma 0_{AE}$ are standard deviations of the intensities $I0_{Al,n}$ and $I0_{AE,n}$, respectively. The standard deviations $\sigma 0_{Al}$ and $\sigma 0_{AE}$ are given by the following formulae (21) and (22).

$$C0_{Al,AE} = \frac{1}{100} \sum_{n=1}^{100} (I0_{Al,n} - I0_{Al,av})(I0_{AE,n} - I0_{AE,av}) \quad (20)$$

$$\sigma 0_{Al} = \sqrt{\frac{1}{100} \sum_{n=1}^{100} (I0_{Al,n} - I0_{Al,av})^2} \quad (21)$$

$$\sigma 0_{AE} = \sqrt{\frac{1}{100} \sum_{n=1}^{100} (I0_{AE,n} - I0_{AE,av})^2} \quad (22)$$

In the above formulae, $I0_{Al,av}$ is an arithmetic mean of the $I0_{Al,n}$ given by the formula (23) below. $I0_{AE,av}$ is an arithmetic mean of the $I0_{AE,n}$ given by the following formula (24).

$$I0_{Al,av} = \sqrt{\frac{1}{100} \sum_{n=1}^{100} I0_{Al,n}} \quad (23)$$

$$I0_{AE,av} = \sqrt{\frac{1}{100} \sum_{n=1}^{100} I0_{AE,n}} \quad (24)$$

For the above-described measurements, for example, Ultra-High Resolution Field-Emission Scanning Electron Microscope S-4800 manufactured by HITACHI HIGH-TECHNOLOGIES Co. Ltd. can be used.

Various modifications can be made to the above-described exhaust gas-purifying catalyst 1.

Figure 4:
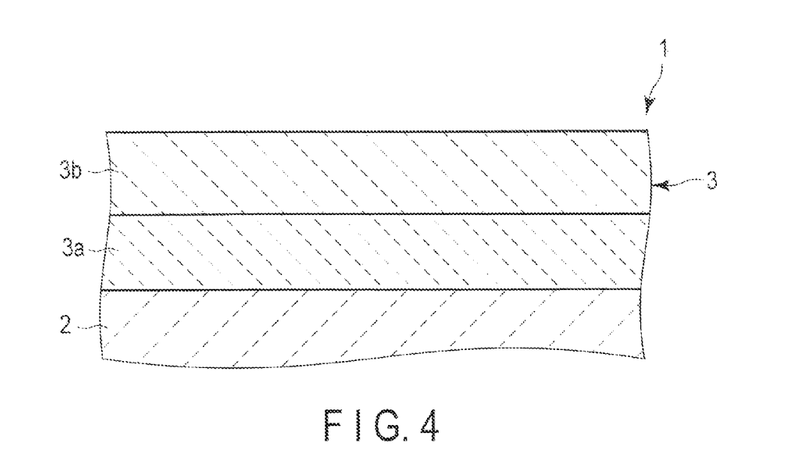
FIG. 4 is an enlarged cross-sectional view schematically showing a part of an exhaust gas-purifying catalyst according to a modified example.

FIG. 4 is an enlarged cross-sectional view schematically showing a part of an exhaust gas-purifying catalyst according to a modified example. This exhaust gas-purifying catalyst 1 is the same as the exhaust gas-purifying catalyst 1 described with reference to FIGS. 1 to 3 except that the following structure is employed.

That is, in the exhaust gas-purifying catalyst 1 shown in FIG. 4, the catalytic layer 3 has a multilayer structure. Specifically, the catalytic layer 3 includes a first catalytic layer 3a and a second catalytic layer 3b.

The first catalytic layer 3a is interposed between the substrate 2 and the second catalytic layer 3b. The first catalytic layer 3a is the same as the catalytic layer 3 of the exhaust gas-purifying catalyst 1 described with reference to FIGS. 1 to 3 except that the precious metal 34 is palladium and/or platinum.

The second catalytic layer 3b covers the first catalytic layer 3a. The second catalytic layer 3b is the same as the catalytic layer 3 of the exhaust gas-purifying catalyst 1 described with reference to FIGS. 1 to 3 except that the precious metal 34 is rhodium and the alkaline-earth metal and/or the compound thereof 32 is optional components.

In the case where this structure is employed, poisoning of the precious metal 34 contained in the first catalytic layer 3a by HC can be suppressed. Therefore, this exhaust gas-purifying catalyst 1 also delivers an excellent $NO_x$-purifying performance even after a long-term use.

Figure 5:
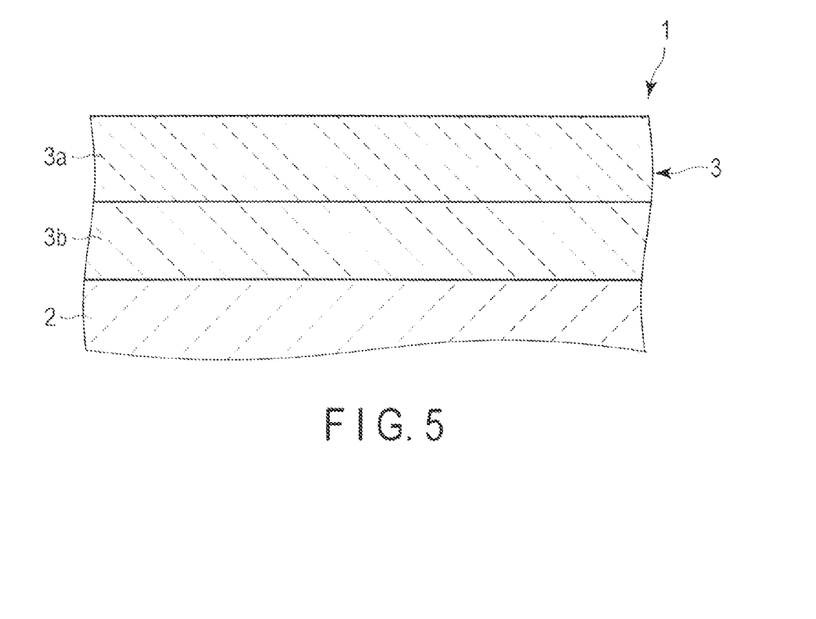
FIG. 5 is an enlarged cross-sectional view schematically showing a part of an exhaust gas-purifying catalyst according to another modified example.

FIG. 5 is an enlarged cross-sectional view schematically showing a part of an exhaust gas-purifying catalyst according to another modified example. This exhaust gas-purifying catalyst 1 is the same as the exhaust gas-purifying catalyst 1 described with reference to FIG. 4 except that the order in which the first catalytic layer 3a and the second catalytic layer 3b are stacked is reversed.

In the case where this structure is employed, poisoning of the precious metal 34 contained in the first catalytic layer 3a by HC can be suppressed. Therefore, this exhaust gas-purifying catalyst 1 also delivers an excellent $NO_x$-purifying performance even after a long-term use.

As above, the catalytic layer 3 of the exhaust gas-purifying catalyst 1 may have a multilayer structure.

EXAMPLES

Examples of the present invention will be described below.
<Manufacture of Catalyst C1>

The exhaust gas-purifying catalyst 1 shown in FIGS. 1 to 3 was manufactured by the following method.

Prepared was slurry containing alumina powder, toluene, lauric acid and trifluoroacetic acid. Barium oxide was added to the slurry, and aqueous sodium sulfate was further added to the slurry. After stirring the slurry at 65° C. for 24 hours, it was filtrated. The filter cake thus obtained was dried and then fired at 240° C. for 12 hours. As above, powder made of 90 g of alumina particles and 0.05 g of barium sulfate supported on the surfaces thereof was obtained. Hereinafter, this powder is referred to as "powder P1".

Next, prepared was slurry that contained 90.05 g of the powder P1, 100 g of oxygen storage material, and aqueous palladium nitrate containing 1 g of palladium. As the oxygen storage material, cerium-zirconium composite oxide powder in which mass ratio of ceria to zirconia was 7/3 was used. Hereinafter, this slurry is referred to as "slurry S1".

Subsequently, a monolith honeycomb substrate 2 made of cordierite was coated with the whole amount of slurry S1. The monolith honeycomb substrate used herein had a length of 100 mm and a volumetric capacity of 1.0 L and was provided with 900 cells per 1 square inch. The coated film was dried at 250° C. for 1 hour and then fired at 500° C. for 1 hour to form a catalytic layer 3 on the monolith honeycomb substrate 2.

Thus, the exhaust gas-purifying catalyst 1 shown in FIGS. 1 to 3 was completed. Hereinafter, this exhaust gas-purifying catalyst 1 is referred to as "catalyst C1".
<Manufacture of Catalyst C2>

The exhaust gas-purifying catalyst 1 shown in FIGS. 1 to 3 was manufactured by the following method.

Powder made of 90 g of alumina particles and 0.1 g of barium sulfate supported by the surfaces thereof was obtained by almost the same method as that described for the powder P1. Hereinafter, this powder is referred to as "powder P2".

Next, slurry was prepared by the same method as that described for the slurry S1 except that 90.1 g of powder P2 was used instead of 90.05 g of powder P1. Hereinafter, this slurry is referred to as "slurry S2".

Then, the exhaust gas-purifying catalyst 1 shown in FIGS. 1 to 3 was completed by the same method as that described for the catalyst C1 except that the slurry S2 was used instead of the slurry S1. Hereinafter, this exhaust gas-purifying catalyst 1 is referred to as "catalyst C2".
<Manufacture of Catalyst C3>

The exhaust gas-purifying catalyst 1 shown in FIGS. 1 to 3 was manufactured by the following method.

Powder made of 90 g of lumina particles and 10 g of barium sulfate supported by the surfaces thereof was obtained by almost the same method as that described for the powder P1. Hereinafter, this powder is referred to as "powder P3".

Next, slurry was prepared by the same method as that described for the slurry S1 except that 100 g of powder P3 was used instead of 90.05 g of powder P1. Hereinafter, this slurry is referred to as "slurry S3".

Then, the exhaust gas-purifying catalyst 1 shown in FIGS. 1 to 3 was completed by the same method as that described for the catalyst C1 except that the slurry S3 was used instead of the slurry S1. Hereinafter, this exhaust gas-purifying catalyst 1 is referred to as "catalyst C3".
<Manufacture of Catalyst C4>

The exhaust gas-purifying catalyst 1 shown in FIGS. 1 to 3 was manufactured by the following method.

Powder made of 90 g of alumina particles and 80 g of barium sulfate supported by the surfaces thereof was obtained by almost the same method as that described for the powder P1. Hereinafter, this powder is referred to as "powder P4".

Next, slurry was prepared by the same method as that described for the slurry S1 except that 170 g of powder P4 was used instead of 90.05 g of powder P1. Hereinafter, this slurry is referred to as "slurry S4".

Then, the exhaust gas-purifying catalyst 1 shown in FIGS. 1 to 3 was completed by the same method as that described for the catalyst C1 except that the slurry S4 was used instead of the slurry S1. Hereinafter, this exhaust gas-purifying catalyst 1 is referred to as "catalyst C4".
<Manufacture of Catalyst C5>

The exhaust gas-purifying catalyst 1 shown in FIGS. 1 to 3 was manufactured by the following method.

Powder made of 90 g of alumina particles and 100 g of barium sulfate supported by the surfaces thereof was obtained by almost the same method as that described for the powder P1. Hereinafter, this powder is referred to as "powder P5".

Next, slurry was prepared by the same method as that described for the slurry S1 except that 190 g of powder P5 was used instead of 90.05 g of powder P1. Hereinafter, this slurry is referred to as "slurry S5".

Then, the exhaust gas-purifying catalyst 1 shown in FIGS. 1 to 3 was completed by the same method as that described for the catalyst C1 except that the slurry S5 was used instead of the slurry S1. Hereinafter, this exhaust gas-purifying catalyst 1 is referred to as "catalyst C5".

<Manufacture of Catalyst C6>

The exhaust gas-purifying catalyst 1 shown in FIGS. 1 to 3 was manufactured by the following method.

As the oxygen storage material, cerium-zirconium composite oxide powder in which a mass ratio of ceria to zirconia was 3/7 was used instead of the cerium-zirconium composite oxide powder in which a mass ratio of ceria to zirconia was 7/3. Except for this, slurry was prepared by the same method as that described for the slurry S1. Hereinafter, this slurry is referred to as "slurry S6".

Then, the exhaust gas-purifying catalyst 1 shown in FIGS. 1 to 3 was completed by the same method as that described for the catalyst C1 except that the slurry S6 was used instead of the slurry S1. Hereinafter, this exhaust gas-purifying catalyst 1 is referred to as "catalyst C6".

<Manufacture of Catalyst C7>

The exhaust gas-purifying catalyst 1 shown in FIGS. 1 to 3 was manufactured by the following method.

Prepared was slurry containing alumina powder, toluene, lauric acid and trifluoroacetic acid. Strontium oxide was added to the slurry, and aqueous sodium sulfate was further added to the slurry. After stirring the slurry at 65° C. for 24 hours, it was filtrated. The filter cake thus obtained was dried and then fired at 240° C. for 12 hours. As above, powder made of 90 g of alumina particles and 7.9 g of strontium sulfate supported on the surfaces thereof was obtained. Hereinafter, this powder is referred to as "powder P6".

Next, slurry was prepared by the same method as that described for the slurry S1 except that 97.9 g of powder P6 was used instead of 90.05 g of powder P1. Hereinafter, this slurry is referred to as "slurry S7".

Then, the exhaust gas-purifying catalyst 1 shown in FIGS. 1 to 3 was completed by the same method as that described for the catalyst C1 except that the slurry S7 was used instead of the slurry S1. Hereinafter, this exhaust gas-purifying catalyst 1 is referred to as "catalyst C7".

<Manufacture of Catalyst C8>

The exhaust gas-purifying catalyst 1 shown in FIGS. 1 to 3 was manufactured by the following method.

Powder made of 90 g of alumina particles and 100 g of strontium sulfate supported by the surfaces thereof was obtained by almost the same method as that described for the powder P6. Hereinafter, this powder is referred to as "powder P7".

Next, slurry was prepared by the same method as that described for the slurry S1 except that 190 g of powder P7 was used instead of 90.05 g of powder P1. Hereinafter, this slurry is referred to as "slurry S8".

Then, the exhaust gas-purifying catalyst 1 shown in FIGS. 1 to 3 was completed by the same method as that described for the catalyst C1 except that the slurry S8 was used instead of the slurry S1. Hereinafter, this exhaust gas-purifying catalyst 1 is referred to as "catalyst C8".

<Manufacture of Catalyst C9>

The exhaust gas-purifying catalyst 1 shown in FIGS. 1 to 3 was manufactured by the following method.

Prepared was slurry containing alumina powder, toluene, lauric acid and trifluoroacetic acid. Calcium oxide was added to the slurry, and aqueous sodium sulfate was further added to the slurry. After stirring the slurry at 65° C. for 24 hours, it was filtrated. The filter cake thus obtained was dried and then fired at 240° C. for 12 hours. As above, powder made of 90 g of alumina particles and 5.9 g of calcium sulfate supported on the surfaces thereof was obtained. Hereinafter, this powder is referred to as "powder P8".

Next, slurry was prepared by the same method as that described for the slurry S1 except that 95.9 g of powder P8 was used instead of 90.05 g of powder P1. Hereinafter, this slurry is referred to as "slurry S9".

Then, the exhaust gas-purifying catalyst 1 shown in FIGS. 1 to 3 was completed by the same method as that described for the catalyst C1 except that the slurry S9 was used instead of the slurry S1. Hereinafter, this exhaust gas-purifying catalyst 1 is referred to as "catalyst C9".

<Manufacture of Catalyst C10>

The exhaust gas-purifying catalyst 1 shown in FIGS. 1 to 3 was manufactured by the following method.

Powder made of 90 g of alumina particles and 100 g of calcium sulfate supported by the surfaces thereof was obtained by almost the same method as that described for the powder P8. Hereinafter, this powder is referred to as "powder P9".

Next, slurry was prepared by the same method as that described for the slurry S1 except that 190 g of powder P9 was used instead of 90.05 g of powder P1. Hereinafter, this slurry is referred to as "slurry S10".

Then, the exhaust gas-purifying catalyst 1 shown in FIGS. 1 to 3 was completed by the same method as that described for the catalyst C1 except that the slurry S10 was used instead of the slurry S1. Hereinafter, this exhaust gas-purifying catalyst 1 is referred to as "catalyst C10".

<Manufacture of Catalyst C11>

The exhaust gas-purifying catalyst 1 shown in FIGS. 1 to 3 was manufactured by the following method.

Prepared was slurry containing alumina powder, toluene, lauric acid and trifluoroacetic acid. Barium oxide was added to the slurry, and aqueous sodium carbonate was further added to the slurry. After stirring the slurry at 65° C. for 24 hours, it was filtrated. The filter cake thus obtained was dried and then fired at 240° C. for 12 hours. As above, powder made of 90 g of alumina particles and 8.4 g of barium carbonate supported on the surfaces thereof was obtained. Hereinafter, this powder is referred to as "powder P10".

Next, slurry was prepared by the same method as that described for the slurry S1 except that 98.4 g of powder P10 was used instead of 90.05 g of powder P1. Hereinafter, this slurry is referred to as "slurry S11".

Then, the exhaust gas-purifying catalyst 1 shown in FIGS. 1 to 3 was completed by the same method as that described for the catalyst C1 except that the slurry S11 was used instead of the slurry S1. Hereinafter, this exhaust gas-purifying catalyst 1 is referred to as "catalyst C11".

<Manufacture of Catalyst C12>

The exhaust gas-purifying catalyst 1 shown in FIGS. 1 to 3 was manufactured by the following method.

Prepared was slurry containing alumina powder, toluene, lauric acid and trifluoroacetic acid. Barium oxide was added to the slurry, and aqueous sodium acetate was further added to the slurry. After stirring the slurry at 65° C. for 24 hours, it was filtrated. The filter cake thus obtained was dried and then fired at 240° C. for 12 hours. As above, powder made of 90 g of alumina particles and 10.9 g of barium acetate supported on the surfaces thereof was obtained. Hereinafter, this powder is referred to as "powder P11".

Next, slurry was prepared by the same method as that described for the slurry S1 except that 100.9 g of powder P11 was used instead of 90.05 g of powder P1. Hereinafter, this slurry is referred to as "slurry S12".

Then, the exhaust gas-purifying catalyst 1 shown in FIGS. 1 to 3 was completed by the same method as that described for the catalyst C1 except that the slurry S12 was used instead of the slurry S1. Hereinafter, this exhaust gas-purifying catalyst 1 is referred to as "catalyst C12".

<Manufacture of Catalyst C13>

The exhaust gas-purifying catalyst 1 shown in FIGS. 1 to 3 was manufactured by the following method.

Prepared was slurry containing alumina powder, toluene, lauric acid and trifluoroacetic acid. Barium oxide was added to the slurry. After stirring the slurry at 65° C. for 24 hours, it was filtrated. The filter cake thus obtained was dried and then fired at 240° C. for 12 hours. As above, powder made of 90 g of alumina particles and 6.5 g of barium oxide supported on the surfaces thereof was obtained. Hereinafter, this powder is referred to as "powder P12".

Next, slurry was prepared by the same method as that described for the slurry S1 except that 96.5 g of powder P12 was used instead of 90.05 g of powder P1. Hereinafter, this slurry is referred to as "slurry S13".

Then, the exhaust gas-purifying catalyst 1 shown in FIGS. 1 to 3 was completed by the same method as that described for the catalyst C1 except that the slurry S13 was used instead of the slurry S1. Hereinafter, this exhaust gas-purifying catalyst 1 is referred to as "catalyst C13".

<Manufacture of Catalyst C14>

The exhaust gas-purifying catalyst 1 shown in FIGS. 1 to 3 was manufactured by the following method.

Prepared was slurry containing alumina powder, toluene, lauric acid and trifluoroacetic acid. Barium oxide was added to the slurry, and aqueous sodium nitrate was further added to the slurry. After stirring the slurry at 65° C. for 24 hours, it was filtrated. The filter cake thus obtained was dried and then fired at 240° C. for 12 hours. As above, powder made of 90 g of alumina particles and 11.1 g of barium nitrate supported on the surfaces thereof was obtained. Hereinafter, this powder is referred to as "powder P13".

Next, slurry was prepared by the same method as that described for the slurry S1 except that 90.05 g of powder P14 was used instead of 90.05 g of powder P1. Hereinafter, this slurry is referred to as "slurry S14".

Then, the exhaust gas-purifying catalyst 1 shown in FIGS. 1 to 3 was completed by the same method as that described for the catalyst C1 except that the slurry S14 was used instead of the slurry S1. Hereinafter, this exhaust gas-purifying catalyst 1 is referred to as "catalyst C14".

<Manufacture of Catalyst C15>

The exhaust gas-purifying catalyst 1 shown in FIGS. 1 to 3 was manufactured by the following method.

Aqueous rhodium nitrate containing 1 g of rhodium was used instead of aqueous palladium nitrate containing 1 g of palladium. Except for this, slurry was prepared by the same method as that described for the slurry S3. Hereinafter, this slurry is referred to as "slurry S15".

Then, the exhaust gas-purifying catalyst 1 shown in FIGS. 1 to 3 was completed by the same method as that described for the catalyst C1 except that the slurry S15 was used instead of the slurry S1. Hereinafter, this exhaust gas-purifying catalyst 1 is referred to as "catalyst C15".

<Manufacture of Catalyst C16>

The exhaust gas-purifying catalyst 1 shown in FIGS. 1 to 3 was manufactured by the following method.

Aqueous rhodium nitrate containing 1 g of rhodium was used instead of aqueous palladium nitrate containing 1 g of palladium. Except for this, slurry was prepared by the same method as that described for the slurry S5. Hereinafter, this slurry is referred to as "slurry S16".

Then, the exhaust gas-purifying catalyst 1 shown in FIGS. 1 to 3 was completed by the same method as that described for the catalyst C1 except that the slurry S16 was used instead of the slurry S1. Hereinafter, this exhaust gas-purifying catalyst 1 is referred to as "catalyst C16".

<Manufacture of Catalyst C17>

The exhaust gas-purifying catalyst 1 shown in FIGS. 1 to 3 was manufactured by the following method.

Aqueous dinitrodiamine platinum nitrate containing 1 g of platinum was used instead of aqueous palladium nitrate containing 1 g of palladium. Except for this, slurry was prepared by the same method as that described for the slurry S3. Hereinafter, this slurry is referred to as "slurry S17".

Then, the exhaust gas-purifying catalyst 1 shown in FIGS. 1 to 3 was completed by the same method as that described for the catalyst C1 except that the slurry S17 was used instead of the slurry S1. Hereinafter, this exhaust gas-purifying catalyst 1 is referred to as "catalyst C17".

<Manufacture of Catalyst C18>

The exhaust gas-purifying catalyst 1 shown in FIGS. 1 to 3 was manufactured by the following method.

Aqueous dinitrodiamine platinum nitrate containing 1 g of platinum was used instead of aqueous palladium nitrate containing 1 g of palladium. Except for this, slurry was prepared by the same method as that described for the slurry S5. Hereinafter, this slurry is referred to as "slurry S18".

Then, the exhaust gas-purifying catalyst 1 shown in FIGS. 1 to 3 was completed by the same method as that described for the catalyst C1 except that the slurry S18 was used instead of the slurry S1. Hereinafter, this exhaust gas-purifying catalyst 1 is referred to as "catalyst C18".

<Manufacture of Catalyst C19>

The exhaust gas-purifying catalyst 1 shown in FIG. 4 was manufactured by the following method.

The same monolith honeycomb substrate 2 as that used in the manufacture of the catalyst 1 was coated with a half amount of the slurry S3. The coated film was dried at 250° C. for 1 hour and then fired at 500° C. for 1 hour to form a catalytic layer 3*a* on the monolith honeycomb substrate 2.

Next, prepared was slurry that contained 45 g of alumina powder, 50 g of oxygen storage material, and aqueous rhodium nitrate containing 0.5 g of rhodium. The oxygen storage material used herein was the same as that used in the preparation of the slurry S1. Hereinafter, this slurry is referred to as "slurry S19".

Then, the above-described monolith honeycomb substrate 2 was coated with the whole amount of slurry S19. The coated film was dried at 250° C. for 1 hour and then fired at 500° C. for 1 hour to form a catalytic layer 3*a* on the catalytic layer 3*a*.

Thus, the exhaust gas-purifying catalyst 1 shown in FIG. 4 was completed. Hereinafter, this exhaust gas-purifying catalyst 1 is referred to as "catalyst C19".

<Manufacture of Catalyst C20>

The exhaust gas-purifying catalyst 1 shown in FIG. 4 was manufactured by the following method.

Powder made of 45 g of alumina particles and 100 g of barium sulfate supported by the surfaces thereof was obtained by almost the same method as that described for the powder P1. Hereinafter, this powder is referred to as "powder P14".

Next, prepared was slurry that contained 145 g of powder P14, 50 g of oxygen storage material, and aqueous palladium nitrate containing 0.5 g of palladium. The oxygen storage material used herein was the same as that used in the preparation of the slurry S1. Hereinafter, this slurry is referred to as "slurry S20".

Then the exhaust gas-purifying catalyst 1 shown in FIG. 4 was completed by the same method as that described for the catalyst C19 except that the whole amount of slurry S20 was used instead of using a half amount of slurry S3. Hereinafter, this exhaust gas-purifying catalyst 1 is referred to as "catalyst C20".

<Manufacture of Catalyst C21>

The exhaust gas-purifying catalyst 1 shown in FIG. 5 was manufactured by the following method.

The same monolith honeycomb substrate 2 as that used in the manufacture of the catalyst 1 was coated with the whole amount of slurry S19. The coated film was dried at 250° C. for 1 hour and then fired at 500° C. for 1 hour to form a catalytic layer 3b on the monolith honeycomb substrate 2.

Next, the above-described monolith honeycomb substrate 2 was coated with a half amount of slurry S3.

The coated film was dried at 250° C. for 1 hour and then fired at 500° C. for 1 hour to form a catalytic layer 3a on the catalytic layer 3b.

Thus, the exhaust gas-purifying catalyst 1 shown in FIG. 5 was completed. Hereinafter, this exhaust gas-purifying catalyst 1 is referred to as "catalyst C21".

<Manufacture of Catalyst C22>

The exhaust gas-purifying catalyst 1 shown in FIGS. 1 to 3 was manufactured by the following method.

Slurry was prepared by the same method as that described for the slurry S3 except that aqueous palladium nitrate containing 0.5 g of palladium and aqueous rhodium nitrate containing 0.5 g of rhodium were used instead of aqueous palladium nitrate containing 1 g of palladium. Hereinafter, this slurry is referred to as "slurry S21".

Then, the exhaust gas-purifying catalyst 1 shown in FIGS. 1 to 3 was completed by the same method as that described for the catalyst C1 except that the slurry S21 was used instead of the slurry S1. Hereinafter, this exhaust gas-purifying catalyst 1 is referred to as "catalyst C22".

<Manufacture of Catalyst C23>

An exhaust gas-purifying catalyst was manufactured by the following method.

Prepared was slurry that contained 90 g of alumina powder, 10 g of barium sulfate powder, 100 g of oxygen storage material, and aqueous palladium nitrate containing 1 g of palladium. The barium sulfate powder used herein had an average particle diameter of 1.8 µm. The oxygen storage material used herein was the same as that used in the preparation of the slurry S1. Hereinafter, this slurry is referred to as "slurry S22".

Then, an exhaust gas-purifying catalyst was completed by the same method as that described for the catalyst C1 except that the slurry S22 was used instead of the slurry S1. Hereinafter, this exhaust gas-purifying catalyst is referred to as "catalyst C23".

<Manufacture of Catalyst C24>

An exhaust gas-purifying catalyst was manufactured by the following method.

Prepared was slurry containing cerium-zirconium composite oxide powder, toluene, lauric acid and trifluoroacetic acid. The cerium-zirconium composite oxide powder used herein was the same as that used in the preparation of the slurry S1. Barium oxide was added to the slurry, and aqueous sodium sulfate was further added to the slurry. After stirring the slurry at 65° C. for 24 hours, it was filtrated. The filter cake thus obtained was dried and then fired at 240° C. for 12 hours. As above, powder made of 100 g of cerium-zirconium composite oxide particles and 10 g of barium sulfate supported on the surfaces thereof was obtained. Hereinafter, this powder is referred to as "powder P15".

Next, prepared was slurry that contained 110 g of the powder P15, 90 g of alumina powder, and aqueous palladium nitrate containing 1 g of palladium. Hereinafter, this slurry is referred to as "slurry S23".

Then, an exhaust gas-purifying catalyst was completed by the same method as that described for the catalyst C1 except that the slurry S23 was used instead of the slurry S1. Hereinafter, this exhaust gas-purifying catalyst is referred to as "catalyst C24".

<Manufacture of Catalyst C25>

An exhaust gas-purifying catalyst was manufactured by the following method.

Prepared was slurry that contained 90 g of alumina powder, aqueous solution containing 10.9 g of barium acetate, 100 g of oxygen storage material, and aqueous palladium nitrate containing 1 g of palladium. The oxygen storage material used herein was the same as that used in the preparation of the slurry S1. Hereinafter, this slurry is referred to as "slurry S24".

Then, an exhaust gas-purifying catalyst was completed by the same method as that described for the catalyst C1 except that the slurry S24 was used instead of the slurry S1. Hereinafter, this exhaust gas-purifying catalyst is referred to as "catalyst C25".

<Manufacture of Catalyst C26>

An exhaust gas-purifying catalyst was manufactured by the following method.

Prepared was slurry containing alumina powder and water. Aqueous barium acetate was added to the slurry, and sulfuric acid was further added to the slurry. After stirring the slurry at 65° C. for 24 hours, it was filtrated. The filter cake thus obtained was dried and then fired at 240° C. for 12 hours. As above, powder made of 90 g of alumina particles and 10 g of barium sulfate supported on the surfaces thereof was obtained. Hereinafter, this powder is referred to as "powder P16".

Then, an exhaust gas-purifying catalyst was completed by the same method as that described for the catalyst C1 except that 100 g of powder P16 was used instead of 90.05 g of powder P1. Hereinafter, this exhaust gas-purifying catalyst is referred to as "catalyst C26".

<Manufacture of Catalyst C27>

An exhaust gas-purifying catalyst was manufactured by the following method.

Prepared was slurry that contained 90 g of alumina powder, 10 g of barium sulfate powder, 100 g of oxygen storage material, aqueous palladium nitrate containing 1 g of palladium, and 10 g of citric acid. The barium sulfate powder used herein had an average particle diameter of 0.021 µm. The oxygen storage material used herein was the same as that used in the preparation of the slurry S1. Hereinafter, this slurry is referred to as "slurry S25".

Then, an exhaust gas-purifying catalyst was completed by the same method as that described for the catalyst C1 except that the slurry S25 was used instead of the slurry S1. Hereinafter, this exhaust gas-purifying catalyst is referred to as "catalyst C27".

<Manufacture of Catalyst C28>

The exhaust gas-purifying catalyst 1 shown in FIGS. 1 to 3 was manufactured by the following method.

Powder made of 90 g of alumina particles and 3 g of barium sulfate supported by the surfaces thereof was obtained by almost the same method as that described for the powder P1. Hereinafter, this powder is referred to as "powder P17".

Next, slurry was prepared by the same method as that described for the slurry S1 except that 93.0 g of powder P17 was used instead of 90.05 g of powder P1. Hereinafter, this slurry is referred to as "slurry S26".

Then, the exhaust gas-purifying catalyst 1 shown in FIGS. 1 to 3 was completed by the same method as that described for the catalyst C1 except that the slurry S26 was used instead of the slurry S1. Hereinafter, this exhaust gas-purifying catalyst 1 is referred to as "catalyst C28".

<Manufacture of Catalyst C29>

The exhaust gas-purifying catalyst 1 shown in FIGS. 1 to 3 was manufactured by the following method.

Powder made of 90 g of alumina particles and 20 g of barium sulfate supported by the surfaces thereof was obtained by almost the same method as that described for the powder P1. Hereinafter, this powder is referred to as "powder P18".

Next, slurry was prepared by the same method as that described for the slurry S1 except that 110.0 g of powder P18 was used instead of 90.05 g of powder P1. Hereinafter, this slurry is referred to as "slurry S27".

Then, the exhaust gas-purifying catalyst 1 shown in FIGS. 1 to 3 was completed by the same method as that described for the catalyst C1 except that the slurry S27 was used instead of the slurry S1. Hereinafter, this exhaust gas-purifying catalyst 1 is referred to as "catalyst C29".

<Tests>

Each of the catalysts C1 to C29 was mounted on an automobile having an engine with a piston displacement of 1.0 L. Each automobile was driven to cover an endurance travel distance of 60,000 km. Thereafter, emission per 1 km of travel distance was determined using 10 and 15-mode method and 11-mode method for each of nonmethane hydrocarbons (NMHC), CO and $NO_x$. Then, the emission per 1 km of travel distance using 10 and 15-mode method was multiplied by 0.88, the emission per 1 km of travel distance using 11-mode method was multiplied by 0.12, and the sum of the resultant values was calculated to obtain emission. Note that the NMHC emission is a value in gram obtained by converting a value represented in volumetric ratio based on equivalent carbon number. These results and the components of the catalytic layers are summarized in TABLES 1 to 4 below.

TABLE 1

| Catalyst | Alumina Amount (g) | Alkaline-earth metal compound Species | Amount (mol/L) | Oxygen storage material Species | Amount (g/L) | Precious metal Species | Amount (g/L) | Emission (g/km) NMHC | CO | $NO_x$ |
|---|---|---|---|---|---|---|---|---|---|---|
| C1 | 90 | $BaSO_4$ | $2.14 \times 10^{-4}$ | CZ | 100 | Pd | 1 | 0.032 | 0.183 | 0.043 |
| C2 | 90 | $BaSO_4$ | $4.28 \times 10^{-4}$ | CZ | 100 | Pd | 1 | 0.013 | 0.112 | 0.017 |
| C3 | 90 | $BaSO_4$ | $4.28 \times 10^{-2}$ | CZ | 100 | Pd | 1 | 0.009 | 0.102 | 0.011 |
| C4 | 90 | $BaSO_4$ | $3.43 \times 10^{-1}$ | CZ | 100 | Pd | 1 | 0.012 | 0.121 | 0.018 |
| C5 | 90 | $BaSO_4$ | $4.28 \times 10^{-1}$ | CZ | 100 | Pd | 1 | 0.041 | 0.193 | 0.032 |
| C6 | 90 | $BaSO_4$ | $4.28 \times 10^{-2}$ | ZC | 100 | Pd | 1 | 0.008 | 0.112 | 0.016 |
| C7 | 90 | $SrSO_4$ | $4.28 \times 10^{-2}$ | CZ | 100 | Pd | 1 | 0.011 | 0.115 | 0.014 |
| C8 | 90 | $SrSO_4$ | $4.28 \times 10^{-1}$ | CZ | 100 | Pd | 1 | 0.044 | 0.201 | 0.035 |

TABLE 2

| Catalyst | Alumina Amount (g) | Alkaline-earth metal compound Species | Amount (mol/L) | Oxygen storage material Species | Amount (g/L) | Precious metal Species | Amount (g/L) | Emission (g/km) NMHC | CO | $NO_x$ |
|---|---|---|---|---|---|---|---|---|---|---|
| C9 | 90 | $CaSO_4$ | $4.28 \times 10^{-2}$ | CZ | 100 | Pd | 1 | 0.013 | 0.117 | 0.016 |
| C10 | 90 | $CaSO_4$ | $4.28 \times 10^{-1}$ | CZ | 100 | Pd | 1 | 0.047 | 0.198 | 0.030 |
| C11 | 90 | $BaCO_3$ | $4.28 \times 10^{-2}$ | CZ | 100 | Pd | 1 | 0.010 | 0.104 | 0.013 |
| C12 | 90 | $Ba(CH_3COO)_2$ | $4.28 \times 10^{-2}$ | CZ | 100 | Pd | 1 | 0.011 | 0.108 | 0.012 |
| C13 | 90 | BaO | $4.28 \times 10^{-2}$ | CZ | 100 | Pd | 1 | 0.013 | 0.102 | 0.018 |
| C14 | 90 | $Ba(NO_3)_2$ | $4.28 \times 10^{-2}$ | CZ | 100 | Pd | 1 | 0.014 | 0.109 | 0.013 |
| C15 | 90 | $BaSO_4$ | $4.28 \times 10^{-2}$ | CZ | 100 | Rh | 1 | 0.003 | 0.053 | 0.001 |
| C16 | 90 | $BaSO_4$ | $4.28 \times 10^{-1}$ | CZ | 100 | Rh | 1 | 0.033 | 0.142 | 0.030 |

TABLE 3

| Catalyst | Alumina Amount (g) | Alkaline-earth metal compound Species | Amount (mol/L) | Oxygen storage material Species | Amount (g/L) | Precious metal Species | Amount (g/L) | Emission (g/km) NMHC | CO | $NO_x$ |
|---|---|---|---|---|---|---|---|---|---|---|
| C17 | 90 | $BaSO_4$ | $4.28 \times 10^{-2}$ | CZ | 100 | Pt | 1 | 0.015 | 0.130 | 0.028 |
| C18 | 90 | $BaSO_4$ | $4.28 \times 10^{-1}$ | CZ | 100 | Pt | 1 | 0.052 | 0.221 | 0.052 |
| C19 | 45 | $BaSO_4$ | $2.14 \times 10^{-2}$ | CZ | 50 | Pd | 0.5 | 0.014 | 0.094 | 0.005 |
|  | 45 | — | — | CZ | 50 | Rh | 0.5 |  |  |  |
| C20 | 45 | $BaSO_4$ | $4.28 \times 10^{-1}$ | CZ | 50 | Pd | 0.5 | 0.035 | 0.145 | 0.033 |
|  | 45 | — | — | CZ | 50 | Rh | 0.5 |  |  |  |
| C21 | 45 | — | — | CZ | 50 | Rh | 0.5 | 0.003 | 0.051 | 0.002 |
|  | 45 | $BaSO_4$ | $2.14 \times 10^{-2}$ | CZ | 50 | Pd | 0.5 |  |  |  |
| C22 | 90 | $BaSO_4$ | $4.28 \times 10^{-2}$ | CZ | 100 | Pd, Pt | 0.5, 0.5 | 0.014 | 0.109 | 0.013 |
| C23 | 90 | $BaSO_4$ (powder) | $4.28 \times 10^{-2}$ | CZ | 100 | Pd | 1 | 0.051 | 0.200 | 0.061 |
| C24 | 90 | $BaSO_4$ (supported by OSC material) | $4.28 \times 10^{-2}$ | CZ | 100 | Pd | 1 | 0.054 | 0.225 | 0.063 |

TABLE 4

| Catalyst | Alumina Amount (g) | Alkaline-earth metal compound Species | Amount (mol/L) | Oxygen storage material Species | Amount (g/L) | Precious metal Species | Amount (g/L) | Emission (g/km) NMHC | CO | $NO_x$ |
|---|---|---|---|---|---|---|---|---|---|---|
| C25 | 90 | $Ba(CH_3COO)_2$ (solution) | $4.28 \times 10^{-2}$ | CZ | 100 | Pd | 1 | 0.063 | 0.310 | 0.074 |
| C26 | 90 | $BaSO_4$ [synthesized from $Ba(CH_3COO)_2$ and $H_2SO_4$] | $4.28 \times 10^{-2}$ | CZ | 100 | Pd | 1 | 0.030 | 0.180 | 0.028 |
| C27 | 90 | $BaSO_4$ (powder, citric acid used) | $4.28 \times 10^{-2}$ | CZ | 100 | Pd | 1 | 0.031 | 0.198 | 0.050 |
| C28 | 90 | $BaSO_4$ | $1.29 \times 10^{-2}$ | CZ | 100 | Pd | 1 | 0.009 | 0.104 | 0.011 |
| C29 | 90 | $BaSO_4$ | $8.57 \times 10^{-2}$ | CZ | 100 | Pd | 1 | 0.008 | 0.102 | 0.011 |

In the above tables, "CZ" represents that the cerium-zirconium composite material with a mass ratio of ceria to zirconia of 7/3 was used. "ZC" represents that the cerium-zirconium composite material with a mass ratio of ceria to zirconia of 3/7 was used. "OSC material" indicates the oxygen storage material.

As shown in TABLES 1 to 4, the catalysts C1 to C22, C28 and C29 offered excellent $NO_x$-purifying performance after the endurance test as compared with the catalysts C23 and C24. In particular, the catalysts C2 to C4, C6, C7, C9, C11 to C15, C17, C19, C21, C22, C28 and C29 offered excellent $NO_x$-purifying performance after the endurance test as compared with the catalysts C1, C5, C8, C10, C16, C18 and C23 to C27.

Figure 6:
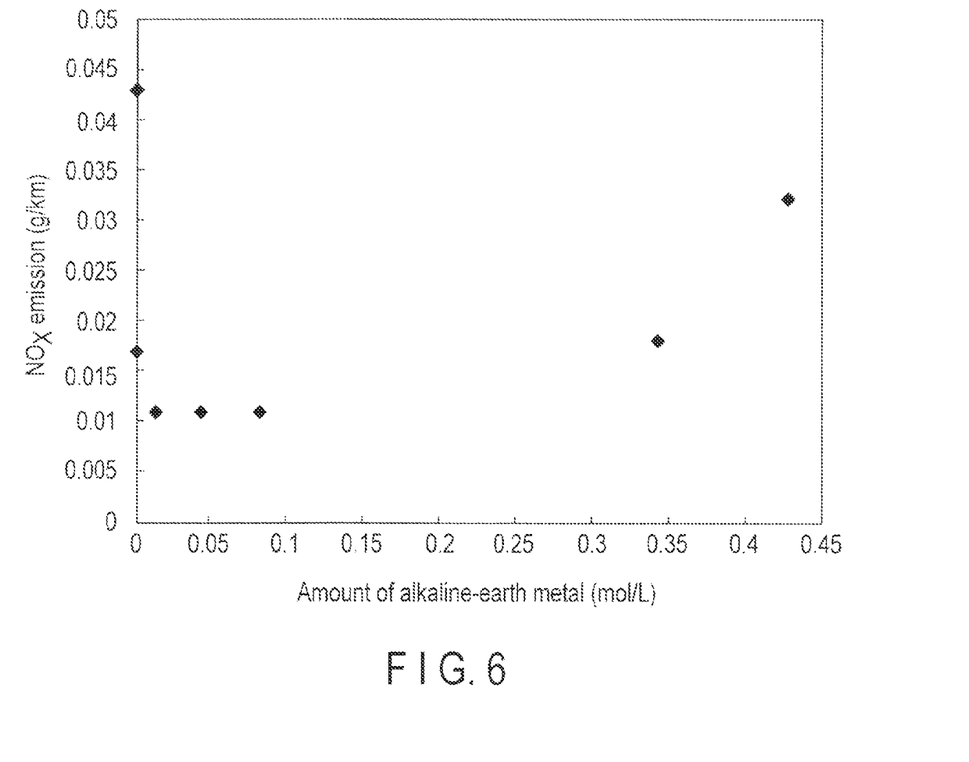
FIG. 6 is a graph showing an example of influence that the amount of the alkaline-earth metal exerts on the $NO_x$-purifying performance after an endurance test.

FIG. 6 is a graph showing an example of influence that the amount of the alkaline-earth metal exerts on the $NO_x$-purifying performance after an endurance test. In the figure, the abscissa represents an amount of alkaline-earth metal, while the ordinate represents $NO_x$ emission after the endurance test. FIG. 6 shows the data obtained for the catalysts C1 to C5, C28 and C29.

As shown in FIG. 6 and TABLE 1, in the case where the amount of alkaline-earth metal was set within a range of about 0.0004 mol/L to about 0.35 mol/L, a higher $NO_x$-purifying performance could be achieved. In the case where the amount of alkaline-earth metal was set within a range of about 0.01 mol/L to about 0.1 mol/L, a still higher $NO_X$-purifying performance could be achieved.

Figure 7:
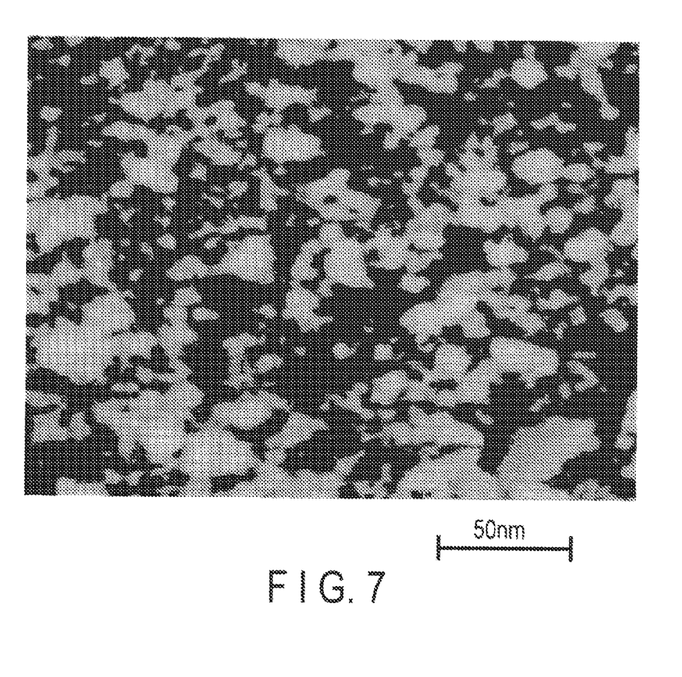
FIG. 7 is a microphotograph of a catalyst according to an example of the present invention.
Figure 8:
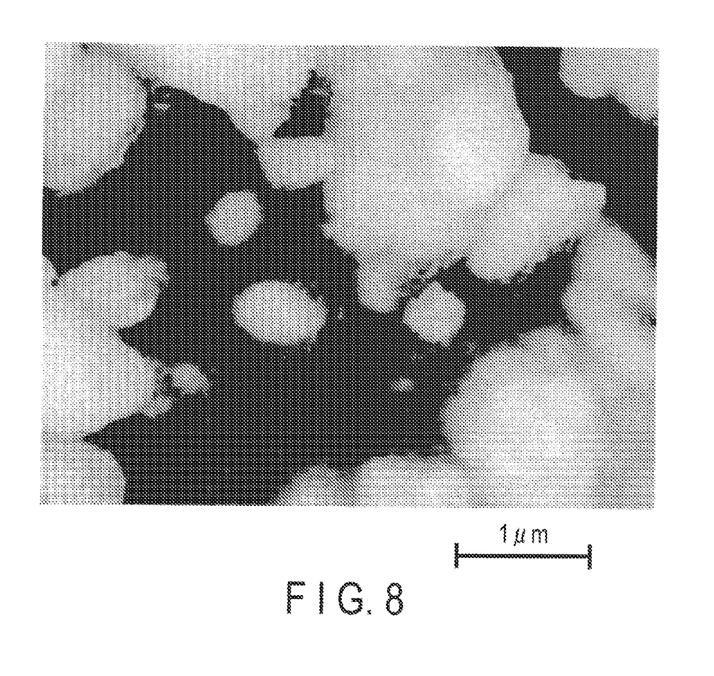
FIG. 8 is a microphotograph of a catalyst according to a comparative example.

Next, a cubic specimen of side 1 cm was cut from each of the catalysts C2 and C23. An image of the catalytic layer of each specimen was taken using a field emission SEM. The magnification was set at 200,000-fold for the catalyst 2. On the other hand, the magnification was set at 20,000-fold for the catalyst C23.

FIG. 7 is a microphotograph of the catalyst C2. FIG. 8 is a microphotograph of the catalyst C23.

In the microphotograph of FIG. 7, fine particles with a particle diameter falling within a range of about 10 nm to about 20 nm are supported by the surfaces of coarse particles and are almost uniformly dispersed on the surfaces. As a result of measurement using X-ray diffraction, it was revealed that the fine particles are barium sulfate, while the coarse particles are alumina.

In the microphotograph of FIG. 8, particles with a particle diameter falling within a range of about 0.5 μm to about 2 μm are supported by the surfaces of coarse particles and are nonuniformly dispersed on the surfaces. As a result of measurement using X-ray diffraction, it was revealed that the nonuniformly dispersed particles are barium sulfate, while the coarse particles are alumina.

<Average Particle Diameter and Correlation Coefficient>

An average particle diameter D0 of the alkaline-earth metal compound was measured on each of the powders P1 to P18. An average particle diameter D of the alkaline-earth metal compound was also measured on each of the catalysts C1 to C10 and C15 to C29.

Then, the correlation coefficient $\rho 0_{Al,AE}$ was obtained for each of the powders P1 to P14 and P16 to P18. The correlation coefficients $\rho_{Al,AE}$ and $\rho_{PM,AE}$ were obtained for each of the catalysts C1 to C10, C15 to C26, C28 and C29. Further, the correlation coefficient $\rho_{Ce,AE}$ was obtained for each of the catalysts C3, C24, C25 and C27.

The results are summarized in TABLES 5 to 8 below.

TABLE 5

| Catalyst | Powder | D0 (μm) | $\rho 0_{Al,AE}$ | D (μm) | $\rho_{Al,AE}$ | $\rho_{PM,AE}$ | $\rho_{Ce,AE}$ | NMHC | CO | NO$_x$ |
|---|---|---|---|---|---|---|---|---|---|---|
| C1 | P1 | 0.010 | 0.85 | 0.010 | 0.82 | 0.73 | — | 0.032 | 0.183 | 0.043 |
| C2 | P2 | 0.015 | 0.87 | 0.015 | 0.84 | 0.75 | — | 0.013 | 0.112 | 0.017 |
| C3 | P3 | 0.021 | 0.85 | 0.021 | 0.82 | 0.73 | 0.30 | 0.009 | 0.102 | 0.011 |
| C4 | P4 | 0.202 | 0.81 | 0.202 | 0.79 | 0.71 | — | 0.012 | 0.121 | 0.018 |
| C5 | P5 | 0.452 | 0.59 | 0.452 | 0.57 | 0.51 | — | 0.041 | 0.193 | 0.032 |
| C6 | P3 | 0.021 | 0.85 | 0.021 | 0.82 | 0.73 | — | 0.008 | 0.112 | 0.016 |
| C7 | P6 | 0.023 | 0.84 | 0.023 | 0.81 | 0.73 | — | 0.011 | 0.115 | 0.014 |
| C8 | P7 | 0.482 | 0.57 | 0.482 | 0.55 | 0.49 | — | 0.044 | 0.201 | 0.035 |

TABLE 6

| Catalyst | Powder | D0 (μm) | $\rho 0_{Al,AE}$ | D (μm) | $\rho_{Al,AE}$ | $\rho_{PM,AE}$ | $\rho_{Ce,AE}$ | NMHC | CO | NO$_x$ |
|---|---|---|---|---|---|---|---|---|---|---|
| C9 | P8 | 0.026 | 0.84 | 0.026 | 0.81 | 0.73 | — | 0.013 | 0.117 | 0.016 |
| C10 | P9 | 0.496 | 0.62 | 0.496 | 0.60 | 0.54 | — | 0.047 | 0.198 | 0.030 |
| C11 | P10 | 0.050 | 0.83 | — | — | — | — | 0.010 | 0.104 | 0.013 |
| C12 | P11 | 0.048 | 0.82 | — | — | — | — | 0.011 | 0.108 | 0.012 |
| C13 | P12 | 0.051 | 0.83 | — | — | — | — | 0.013 | 0.102 | 0.018 |
| C14 | P13 | 0.051 | 0.83 | — | — | — | — | 0.014 | 0.109 | 0.013 |
| C15 | P3 | 0.021 | 0.85 | 0.021 | 0.82 | 0.73 | — | 0.003 | 0.053 | 0.001 |
| C16 | P5 | 0.452 | 0.59 | 0.452 | 0.57 | 0.51 | — | 0.033 | 0.142 | 0.030 |

TABLE 7

| Catalyst | Powder | D0 (μm) | $\rho 0_{Al,AE}$ | D (μm) | $\rho_{Al,AE}$ | $\rho_{PM,AE}$ | $\rho_{Ce,AE}$ | NMHC | CO | NO$_x$ |
|---|---|---|---|---|---|---|---|---|---|---|
| C17 | P3 | 0.021 | 0.85 | 0.021 | 0.82 | 0.73 | — | 0.015 | 0.130 | 0.028 |
| C18 | P5 | 0.452 | 0.59 | 0.452 | 0.57 | 0.51 | — | 0.052 | 0.221 | 0.052 |
| C19 | P3 | 0.021 | 0.85 | 0.021 | 0.82 | 0.73 | — | 0.014 | 0.094 | 0.005 |
| C20 | P14 | 0.492 | 0.61 | 0.492 | 0.59 | 0.53 | — | 0.035 | 0.145 | 0.033 |
| C21 | P3 | 0.021 | 0.85 | 0.021 | 0.82 | 0.73 | — | 0.003 | 0.051 | 0.002 |
| C22 | P3 | 0.021 | 0.85 | 0.021 | 0.82 | 0.73 | — | 0.014 | 0.109 | 0.013 |
| C23 | — | — | — | 1.800 | 0.53 | 0.48 | — | 0.051 | 0.200 | 0.061 |
| C24 | P15 | 0.026 | — | 0.026 | 0.31 | 0.28 | 0.83 | 0.054 | 0.225 | 0.063 |

TABLE 8

| Catalyst | Powder | D0 (μm) | $\rho 0_{Al,AE}$ | D (μm) | $\rho_{Al,AE}$ | $\rho_{PM,AE}$ | $\rho_{Ce,AE}$ | NMHC | CO | NO$_x$ |
|---|---|---|---|---|---|---|---|---|---|---|
| C25 | — | — | — | 2.3 | 0.38 | 0.34 | 0.74 | 0.063 | 0.310 | 0.074 |
| C26 | P16 | 0.315 | 0.70 | 0.315 | 0.67 | 0.60 | — | 0.030 | 0.180 | 0.028 |
| C27 | — | — | — | 0.021 | — | — | 0.79 | 0.031 | 0.198 | 0.050 |
| C28 | P17 | 0.019 | 0.85 | 0.019 | 0.83 | 0.74 | — | 0.009 | 0.104 | 0.011 |
| C29 | P18 | 0.024 | 0.85 | 0.024 | 0.82 | 0.73 | — | 0.008 | 0.102 | 0.011 |

As shown in TABLES 5 to 8, in the case where the average particle diameter D0 or D of the alkaline-earth metal compound is small and the correlation coefficient $\rho 0_{Al,AE}$ or $\rho_{Al,AE}$ was large, an excellent performance in purifying exhaust gas could be achieved. Further, in the case where the correlation coefficient $\rho_{Al,AE}$ is large and the correlation coefficient $\rho_{Ce,AE}$ was small, a higher performance in purifying exhaust gas could be achieved as compared with the case where the correlation coefficient $\rho_{Ce,AE}$ was large.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An exhaust gas-purifying catalyst comprising:
a substrate; and
a first catalytic layer supported by the substrate,
wherein the first catalytic layer includes:
   a first support made of alumina;
   a first oxygen storage material;
   an alkaline-earth metal and/or a compound of alkaline-earth metal selectively supported by a surface of the first support and dispersed on the surface of the first support; and
   a precious metal supported by the surface of the first support,
wherein a ratio of a number of moles of the alkaline-earth metal in the first catalytic layer with respect to a volumetric capacity of the exhaust gas-purifying catalyst falls within a range of 0.0004 mol/L to 0.35 mol/L,
wherein a correlation coefficient $\rho_{Al,AE}$ given by the following formula (1) is 0.79 or more, $$\rho_{Al,AE} = \frac{C_{Al,AE}}{\sigma_{Al}\sigma_{AE}} \quad (1)$$

wherein $C_{Al,AE}$, $\sigma_{Al}$, and $\sigma_{AE}$ in the formula (1) are represented by the following formulae (2), (3) and (4), respectively:

$$C_{Al,AE} = \frac{1}{350}\sum_{i=1}^{350}(I_{Al,i} - I_{Al,av})(I_{AE,i} - I_{AE,av}) \quad (2)$$

$$\sigma_{Al} = \sqrt{\frac{1}{350}\sum_{i=1}^{350}(I_{Al,i} - I_{Al,av})^2} \quad (3)$$

$$\sigma_{AE} = \sqrt{\frac{1}{350}\sum_{i=1}^{350}(I_{AE,i} - I_{AE,av})^2} \quad (4)$$

in the formulae (2) to (4),
i is a natural number of 1 to 350,
$I_{Al,i}$ is intensity of characteristic X-ray emitted by aluminum measured using an electron beam micro analyzer on the i-th intersection point among 350 intersection points of planes and a line, the planes dividing the catalytic layer into 351 equal parts arranged in the thickness direction, and the line being perpendicular to a main surface of the first catalytic layer,
$I_{Al,av}$ is an arithmetic mean of the $I_{Al,i}$ given by the formula (5) below,
$I_{AE,i}$ is intensity of characteristic X-ray emitted by the alkaline-earth metal element that is measured using the electron beam micro analyzer on the i-th intersection point, and
$I_{AE,av}$ is an arithmetic mean of the $I_{AE,i}$ given by the following formula (6):

$$I_{Al,av} = \sqrt{\frac{1}{350}\sum_{i=1}^{350}I_{Al,i}} \quad (5)$$

$$I_{AE,av} = \sqrt{\frac{1}{350}\sum_{i=1}^{350}I_{AE,i}} \quad (6)$$

2. The exhaust gas-purifying catalyst according to claim 1, wherein an average particle diameter of the first support falls within a range of 0.5 μm to 50 μm, and an average particle diameter of the alkaline-earth metal and/or the compound of alkaline-earth metal fall within a range of 5 nm to 200 nm.

3. The exhaust gas-purifying catalyst according to claim 2, wherein the alkaline-earth metal and/or the compound of alkaline-earth metal include one or more substances selected the group consisting of barium sulfate, barium carbonate, barium oxide, barium nitrate calcium sulfate and strontium sulfate.

4. The exhaust gas-purifying catalyst according to claim 3, further comprising a second catalytic layer facing the substrate with the first catalytic layer interposed therebetween,
wherein the first catalytic layer includes at least one of palladium and platinum as the precious metal, and
wherein the second catalytic layer includes:
   a second support made of alumina;
   a second oxygen storage material; and
   rhodium supported by a surface of the second support.

5. The exhaust gas-purifying catalyst according to claim 3, further comprising a second catalytic layer interposed between the substrate and the first catalytic layer,
wherein the first catalytic layer includes at least one of palladium and platinum as the precious metal, and
wherein the second catalytic layer includes:
   a second support made of alumina;
   a second oxygen storage material; and
   rhodium supported by a surface of the second support.

6. An exhaust gas-purifying catalyst comprising:
a substrate; and
a first catalytic layer supported by the substrate,
wherein the first catalytic layer includes:
   a first support made of alumina;
   a first oxygen storage material;
   an alkaline-earth metal and/or a compound of alkaline-earth metal selectively supported by a surface of the first support and dispersed on the surface of the first support; and
   a precious metal supported by the surface of the first support,
wherein a ratio of a number of moles of the alkaline-earth metal in the first catalytic layer with respect to a volumetric capacity of the exhaust gas-purifying catalyst falls within a range of 0.0004 mol/L to 0.35 mol/L,
wherein an average particle diameter of the first support falls within a range of 0.5 μm to 50 μm, and an average particle diameter of the alkaline-earth metal and/or the compound of alkaline-earth metal fall within a range of 5 nm to 200 nm.

7. The exhaust gas-purifying catalyst according to claim 6, wherein the alkaline-earth metal and/or the compound of alkaline-earth metal include one or more substances selected the group consisting of barium sulfate, barium carbonate, barium oxide, barium nitrate calcium sulfate and strontium sulfate.

8. The exhaust gas-purifying catalyst according to claim 7, further comprising a second catalytic layer facing the substrate with the first catalytic layer interposed therebetween,
wherein the first catalytic layer includes at least one of palladium and platinum as the precious metal, and
wherein the second catalytic layer includes:
a second support made of alumina;
a second oxygen storage material; and
rhodium supported by a surface of the second support.

9. The exhaust gas-purifying catalyst according to claim 7, further comprising a second catalytic layer interposed between the substrate and the first catalytic layer,
wherein the first catalytic layer includes at least one of palladium and platinum as the precious metal, and
wherein the second catalytic layer includes:
a second support made of alumina;
a second oxygen storage material; and
rhodium supported by a surface of the second support.

10. An exhaust gas-purifying catalyst comprising:
a substrate; and
a first catalytic layer supported by the substrate,
a second catalytic layer interposed between the substrate and the first catalytic layer,
wherein the first catalytic layer includes:
a first support made of alumina;
a first oxygen storage material;
an alkaline-earth metal and/or a compound of alkaline earth metal selectively supported by a surface of the first support and dispersed on the surface of the first support;
a precious metal supported by the surface of the first support, and
wherein a ratio of a number of moles of the alkaline-earth metal in the first catalytic layer with respect to a volumetric capacity of the exhaust gas-purifying catalyst falls within a range of 0.0004 mol/L to 0.35 mol/L,
wherein the first catalytic layer includes at least one of palladium and platinum as the precious metal, and
wherein the second catalytic layer includes:
a second support made of alumina;
a second oxygen storage material; and
rhodium supported by a surface of the second support.

11. A powdery material for an exhaust gas-purifying catalyst, comprising:
a support made of alumina; and
an alkaline earth metal and/or a compound of alkaline earth metal supported by a surface of the support, dispersed on the surface of the support, and having an average particle diameter of 5 nm to 200 nm,
wherein the powdery material is oxygen storage material free.

12. A method of manufacturing an exhaust gas-purifying catalyst, comprising:
adding an alkaline-earth metal compound and optionally aqueous solution of a sodium salt to a first slurry, the first slurry being oxygen storage material-free and containing a support made of alumina, an organic solvent and a carboxylic acid;
drying and firing the first slurry added with the alkaline-earth metal compound to obtain a powdery material containing the support and the alkaline-earth metal compound supported by a surface of the support;
preparing a second slurry containing the powdery material and an oxygen storage material;
adding an aqueous solution of a precious metal compound to at least one of the first and second slurry; and
drying and firing the second slurry.

* * * * *